United States Patent
Humphrey

Patent Number: 6,137,849
Date of Patent: Oct. 24, 2000

[54] SYSTEM AND METHOD FOR COMMUNICATING DATA OVER A HIGH-SPEED BUS

[75] Inventor: Guy H. Humphrey, Ft. Collins, Colo.

[73] Assignee: Agilent Technologies, Palo Alto, Calif.

[21] Appl. No.: 09/150,059

[22] Filed: Sep. 9, 1998

[51] Int. Cl.$^7$ ..................................................... H04L 7/00

[52] U.S. Cl. ........................................... 375/354; 375/220

[58] Field of Search ..................................... 375/220, 222, 375/257, 259, 260, 286, 295, 354, 377, 219; 333/1, 100, 101; 793/400; 713/600

[56] References Cited

U.S. PATENT DOCUMENTS

| | | | |
|---|---|---|---|
| 4,891,806 | 1/1990 | Farias et al. | 370/503 |
| 5,253,271 | 10/1993 | Montgomery | 375/295 |
| 5,691,832 | 11/1997 | Liedenbaum et al. | 359/115 |
| 5,715,280 | 2/1998 | Sandberg et al. | 375/260 |
| 5,787,120 | 7/1998 | Louagie et al. | 375/257 |

*Primary Examiner*—Stephen Chin
*Assistant Examiner*—Lenny Jiang

[57] ABSTRACT

The present invention is generally directed to a method and apparatus for transferring data from an integrated circuit that is capable of bidirectional data communication. In accordance with one aspect of the invention, an apparatus is provided having a circuit for splitting the data into two portions—a high bit portion and a low bit portion. The circuit also includes two data paths. A first data path communicates the high bit portion of the data and a second data path communicates the low bit portion of the data. The apparatus further includes an output circuit that is configured to connect outputs of the first and second data paths to a common, bidirectional data bus. Finally the apparatus includes a hold circuit configured to hold a last data value on the common data bus for at least one clock cycle before allowing circuitry to receive data from the common bus. A method is also provided for transferring data from an integrated circuit capable of bidirectional data communication. The method operates by splitting data into a first group of bits and a second group of bits. The method further includes steps of transmitting the first group of bits along a first data path, and transmitting the second group of bits along a second data path. The method then electrically connects an output of the first data path to an output of the second data path at a common directional data bus, and alternatively transmits data over the first path and the second path. When alternating the data transmissions in this way, the method ensures that the two data path outputs are not driven at the same time. Finally, the method holds a last data value on the common bus for at least one clock cycle before receiving data over the common bus.

11 Claims, 8 Drawing Sheets

SYSTEM AND METHOD FOR COMMUNICATING DATA OVER A HIGH-SPEED BUS

BACKGROUND OF INVENTION

1. Field of the Invention

The present invention generally relates to data communications, and more particularly to a system and method for data communications across a high-speed data bus.

2. Discussion of the Related Art

Synchronous data systems have long been known. As is known, a synchronous data system is one in which data transfers occur coincident with a clock or some other strobe signal. In this regard, a driver places data on a bus in a known relation to, for example, a clock signal. In accordance with appropriate system design and defined setup and hold times, the driver places the data on the bus with sufficient time for the data to become valid, before the triggering edge of the clock signal. At the triggering edge (either rising edge or falling edge) of the next clock signal, data placed on the bus is clocked into a receiver.

Typically, the clock or other strobe signal is a global one, that extends throughout a system. In this regard, reference is made to FIG. 1, which shows a block diagram of a portion 10 of a synchronous data system as is known in the prior art. A clock generating component 12 (usually a crystal oscillator) provides a periodic alternating waveform 14, such as a square wave, that provide a synchronizing clock signal for all registered components in the system. The signal is carried on a conductor 16 to various components, and may be passed (through cabling, a motherboard backplane, or otherwise) to other circuit boards in the system.

For purposes of illustration, FIG. 1 shows only a few basic circuit components. These include a CPU 18, such as a microprocessor, and several registers 20, 22, 24. As illustrated, the clock signal 14 is routed to each of these components. When data is to be transferred from the CPU 18 to a register 20, or from a register 20 to the CPU 18, it is transferred in a synchronous manner. For simplicity, chip select circuitry and other control circuitry has been omitted from the drawing, but the existence and operation of such circuitry will be known and appreciated by those skilled in the art. For example, each of the registers 20, 22, and 24 will be uniquely address, as determine by the state of an address bus (not shown). Decoder circuitry, controlled by the address bus, then individually enables or selects the registers 20, 22, and 24, based upon the address specified by the address bus.

By way of example, consider a data transfer from the CPU 18 to the register 20. As illustrated by the small circle at the clock input to the register 20, the register 20 of the illustrated embodiment is active on the negative going edge of the clock signal 14. Thus, the CPU 18 must place the data on the data bus 26 at least some time before the negative going edge of the clock 14. As illustrated in FIG. 2, this is referred to as a setup time. In this regard, the data setup time recognizes that a finite period of time is required for data signals to propagate through components in the CPU before reaching their final state. Therefore, the CPU 18 must begin the output process before the negative going edge of the clock 14. Also, the CPU 18 is required to hold the data for a predetermined period of time after the negative going edge of the clock 14 (known as the hold time). The concepts of setup times and hold times in synchronous data systems are well known and need not be further explained herein.

While synchronous data systems of the type described above provide an effective way of communicating data between circuit components in a synchronized fashion, they suffer a number of shortcomings, as the system clock speeds increase. Specifically, in many data systems presently under design, data transfer rates are 250 mega transfers per second (MT/s), and are fast approaching 500 MT/s. In general, speed is extremely important and the faster the system the better. Conventional global clocked systems are incapable of meeting the requirements of transmitting data from chip to chip at these higher data rates, for a number of reasons. Limitations on clocked data I/O pads, clock skew between chips, and bus length are just a few factors that constrain the maximum speed achievable in a conventional global clocked synchronous data system. Indeed, in conventional systems, bus length was not a significant factor in design. However, in a system demanding a 500 MT/s data transfer rate, exchanges must occur in less than two nanoseconds ($2 \times 10^{-9}$). At these speeds, the delay that may occur along the data path, due in part to bus length, must be a factor for consideration. In fact, the entire manner in which data is communicated must be reconsidered in order to meet the extremely fast data transfer rates desired by present systems.

For example, while high-speed systems still utilize a global clock, there are restrictive limits on the frequency of the global clock. In this regard, the global clock often must drive a number of integrated circuits, which increases the drive load on the global clock. Also, due to the multiple destinations, the global clock signal is often carried on a lengthy bus. Both of these factors limit the frequency of the global clock signal.

It is therefore desirable, in high-speed systems, to effect multiple data transmissions between integrated circuits in a single period of the global clock. Accordingly, it is desired to provide a circuit for use in a high data transfer rate system, that effectively addresses and overcomes this and other shortcomings and concerns of prior art systems.

SUMMARY OF INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method and apparatus for transferring data from an integrated circuit that is capable of bidirectional data communication. In accordance with one aspect of the invention, an apparatus is provided having a circuit for splitting the data into two portions—a high bit portion and a low bit portion. The circuit also includes two data paths. A first data path communicates the high bit portion of the data and a second data path communicates the low bit portion of the data. The apparatus further includes an output circuit that is configured to connect outputs of the first and second data paths to a common, bidirectional data bus. Finally, the apparatus includes a hold circuit configured to hold a last data value on the common data bus for at least one clock cycle before allowing circuitry to receive data from the common bus.

In accordance with a preferred embodiment of the invention, the apparatus further includes at least one scan chain electrically coupled to the first and second data paths.

As is known, scan chains are used for testing circuit devices, and in this instance are used for testing circuit devices in the first and second data paths. Preferably, an output of one of the at least one scan chain is fed back to an input of at least one of the data paths to hold the last data value on the output on the common bidirectional bus, before the apparatus is able to receive data from the common bidirectional bus.

In connection with another novel feature of the apparatus, a test multiplexer that is disposed near the output to satisfy the JTAG standard is integrated into a latch. Advantageously, this particular integrated configuration reduces the clock to Q time of the overall circuit to better accommodate the high speed data exchange. More specifically, the multiplexer is integrated into the latch utilizing a unique charge-sharing capability of the circuit devices that enables the integration of the multiplexer into the latch, and therefore reduces the clock to Q time.

In accordance with another aspect of the present invention, a method is provided for transferring data from an integrated circuit capable of bidirectional data communication. The method operates by splitting data into a first group of bits and a second group of bits. The method further includes steps of transmitting the first group of bits along a first data path, and transmitting the second group of bits along a second data path. The method then electrically connects an output of the first data path to an output of the second data path at a common directional data bus, and alternatively transmits data over the first path and the second path. When alternating the data transmissions in this way, the method ensures that the two data path outputs are not driven at the same time. Finally, the method holds a last data value on the common bus for at least one clock cycle before receiving data over the common bus.

The method of the preferred embodiment further includes the step of using an output from a scan chain associated with the one of the data paths to control the holding of the last data value. In this regard, the step of using an output from a scan chain includes feeding back the scan chain output to multiplexers integrated into the data paths, and controlling the multiplexers to pass the output from the scan chain.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
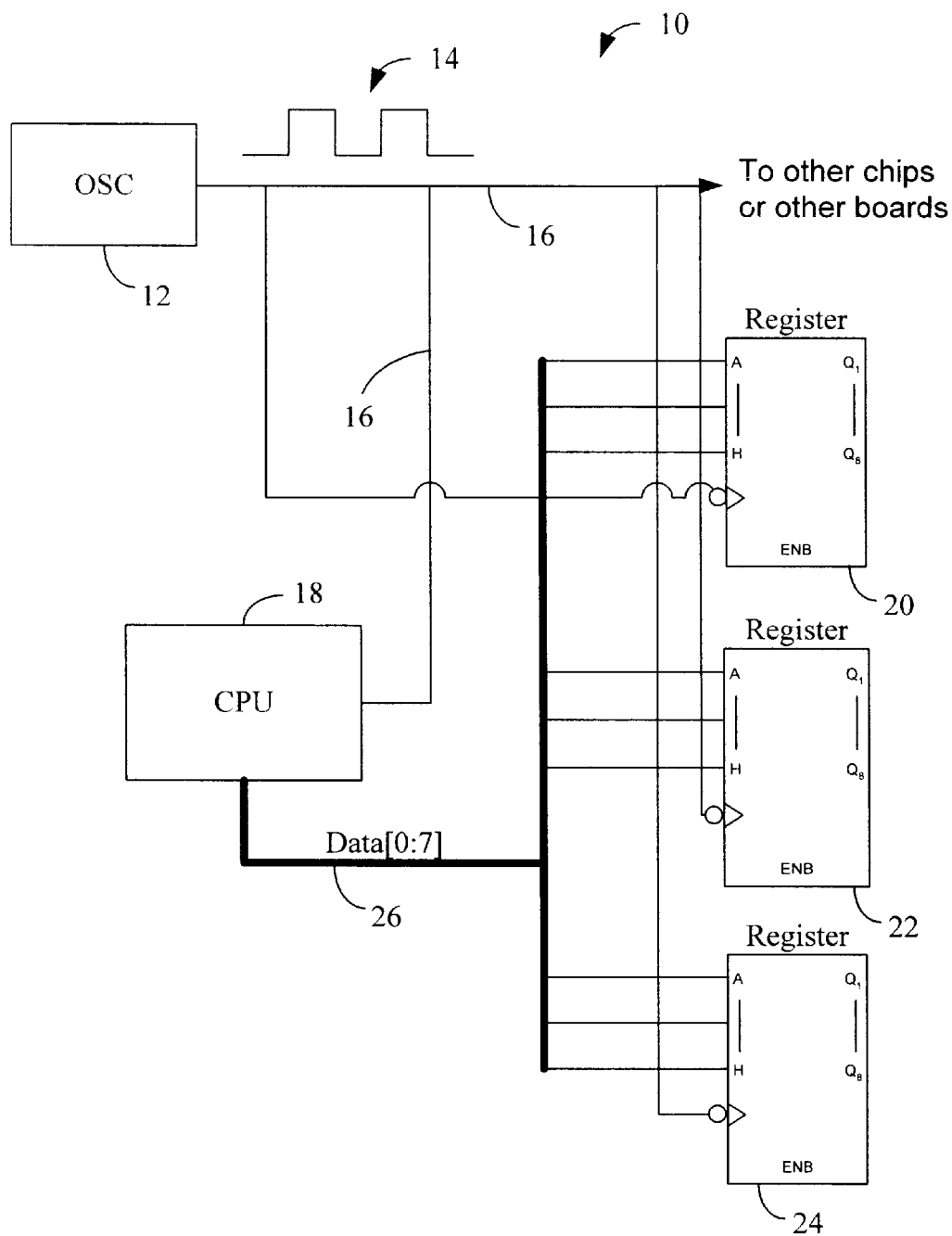
FIG. 1 is a block diagram of a global synchronous data transfer system as is known in the prior art.
Figure 2:
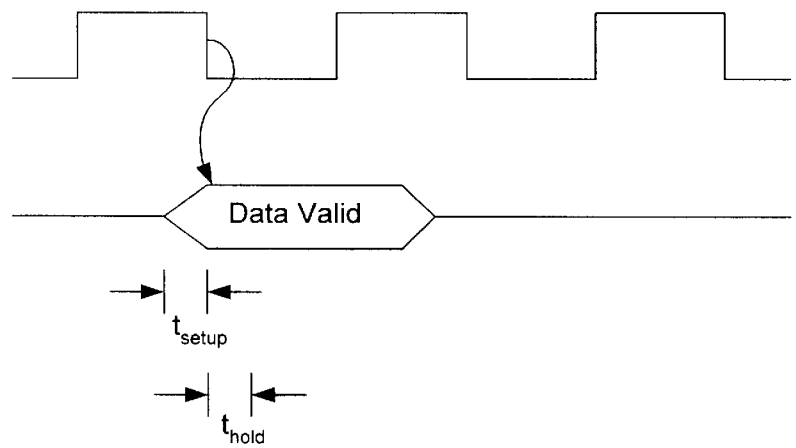
FIG. 2 is a timing diagram illustrating a data transfer of the system of FIG. 1.

Having summarized the invention above, reference will now be made in detail to the description of the invention as illustrated in the drawings. While the invention will be described in connection with these drawings, there is no intent to limit the invention to the embodiment or embodiments disclosed therein. On the contrary, the intent is to cover all alternatives, modifications and equivalents included within the spirit and scope of the invention as defined by the appended claims.

With data transfer rates exceeding the limits that can be handled by conventional synchronous systems, an alternative manner of data communication must be implemented. A first step towards this high speed data transfer implementation is accomplished through what is called a "source synchronous" data transfer. In a source synchronous system, for example, when a first chip transmits data to a second chip, the first chip not only drives the data on a bus extending between the two chips, but also drives a strobe signal that is closely controlled and timed with the data. Recognizing that the data signals must be given sufficient time to set up before the chip disposed to receive the data may latch or otherwise acquire the data, the first chip driving the signals will preferably be controlled to place the data on the bus at some time prior (i.e., sufficient time to allow data set up) to the transmission of the strobe signal. Upon receiving the strobe signal, the second chip may latch or otherwise clock in the data on the data bus.

It will be appreciated that there are, generally, two types of source synchronous systems. A first type of source synchronous system can be classified as a "multi-load" system. In a multi-load source synchronous system, the first chip, or source chip, drives output signals (both data and strobes) that are routed to a plurality of receiving chips. A second type of source synchronous system is a "single-load" system, wherein the source chip drives signals sent to only a single receive chip. As will be appreciated from a basic understanding of transmission line effects and mismatched termination impedances, on multi-load source synchronous systems, transmission reflections are generally more intense than they are in single-load source synchronous systems. Accordingly, the data transfer rate on multi-load synchronous systems is more limited than in single-load source synchronous systems.

The preferred embodiment of the present invention is directed to a single-load source synchronous data transfer system. In this regard, it is an object of the present invention to achieve extremely fast data transfers. To achieve this object, the preferred embodiment operates to drive signals at extremely high rates. Specifically, both low to high transitions, as well as high to low transitions on data signals, as well as strobe signals, occur very rapidly. In a single-load system, impedances may be matched on the receiving end in a way that will minimize signal reflections that are due to sharp edge transitions.

Figure 3:
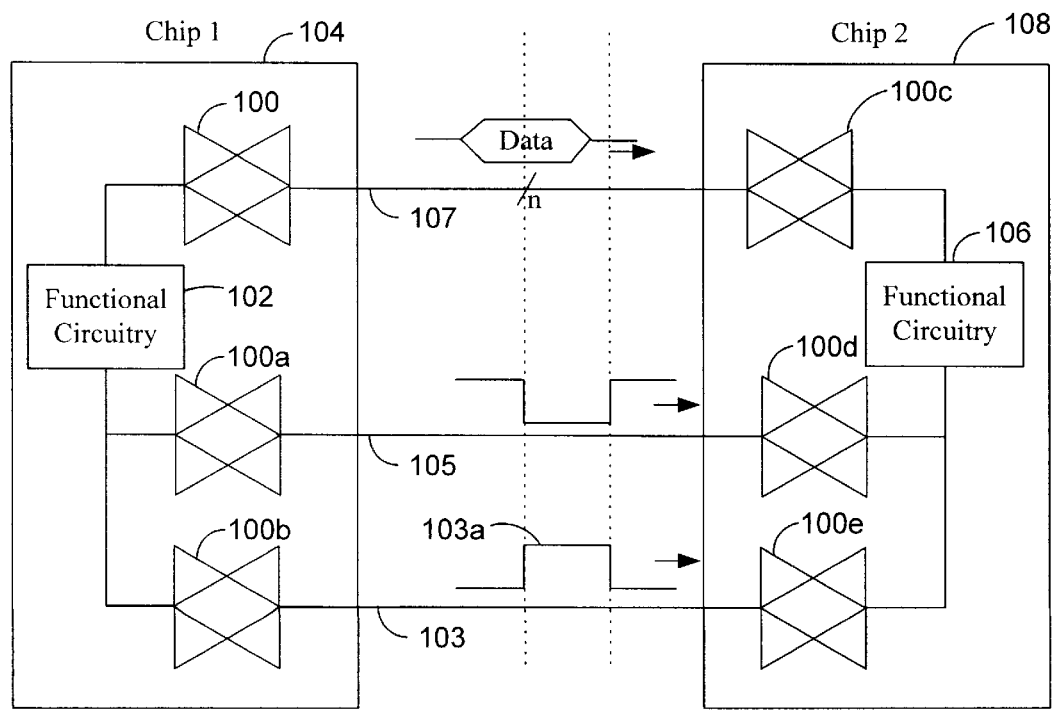
FIG. 3 is a block diagram of a source synchronous data transfer system according to the present invention.

With this general understanding of the present invention, reference is now made to FIG. 3, which is a block diagram illustrating the transfer of data between two chips in the source-synchronous system of the preferred embodiment of the present invention. As shown in FIG. 3, there are a plurality of transceiver circuits 100 and 100a–100e. In this regard, the same circuitry that is used to drive data signals may also be used to drive strobe signals. Furthermore, a plurality of transceiver circuits are used to drive the data signals (one for each data line).

In accordance with the preferred embodiment of the present invention, a first chip 104 is in communication with a second chip 108. The two chips may physically be located on the same printed circuit board, or may alternatively be disposed on two separate circuit boards, whereby the boards may communicate through cabling, across a motherboard back plane, or in some other fashion. As will be appreciated, each chip 104 and 108 includes functional circuitry 102 and 106 that defines the functional operation of the circuitry on the chip 104. As will be appreciated, the signals generated by the functional circuitry do not possess the signal strength to be driven across an exterior data path to a remote chip. Accordingly, such signals are delivered to driver circuits within the transceiver circuits 100, where the signals are bolstered for communication across the bus. Furthermore, the functionality of the chips 104 and 108 may be various (e.g., the chips may be processors, or other devices), and does not form part of the present invention. Accordingly, no discussion will be presented herein as the specific functionality or operation of the functional circuitry 102 and 106.

In the source-synchronous system of the preferred embodiment, a given chip 104 includes a plurality of data lines 107 and two strobe lines 103 and 105. The strobe lines 103 and 105 operate in concert, but out of phase. That is, one strobe line 103 generates a high-going pulse, while the second strobe line 105 will generate a low-going pulse. The timing and synchronization of the strobe signals in relation to the data signal are controlled by the functional circuitry 102. As previously mentioned, the timing relationship between the signals will be such that the data signal is before the active edge of the strobe signals, so as to satisfy the setup time that is required by the receiving chip 108. FIG. 3 illustrates a data transfer from chip 104 to chip 108. As illustrated, in the preferred embodiment, a rising edge of a strobe signal 103a precedes the data signal(s). While the strobe signal 103a is high, a latch of chip 108 is open to receive the data. The data is then placed on the data bus 107, preferably in the middle of the strobe signal. This allows the data signal plenty of time to set up, and also leaves a margin for error or tolerance variances. The data is then latched on the falling edge of the strobe signal 103.

As will be described in more detail below, the preferred embodiment of the present invention effects two data transfers per clock cycle of a global clock signal. The control of this data transfer is described in more detail below. The manner in which the strobe signals are generated, however, does not form part of the invention, and need not be discussed herein.

Figure 4:
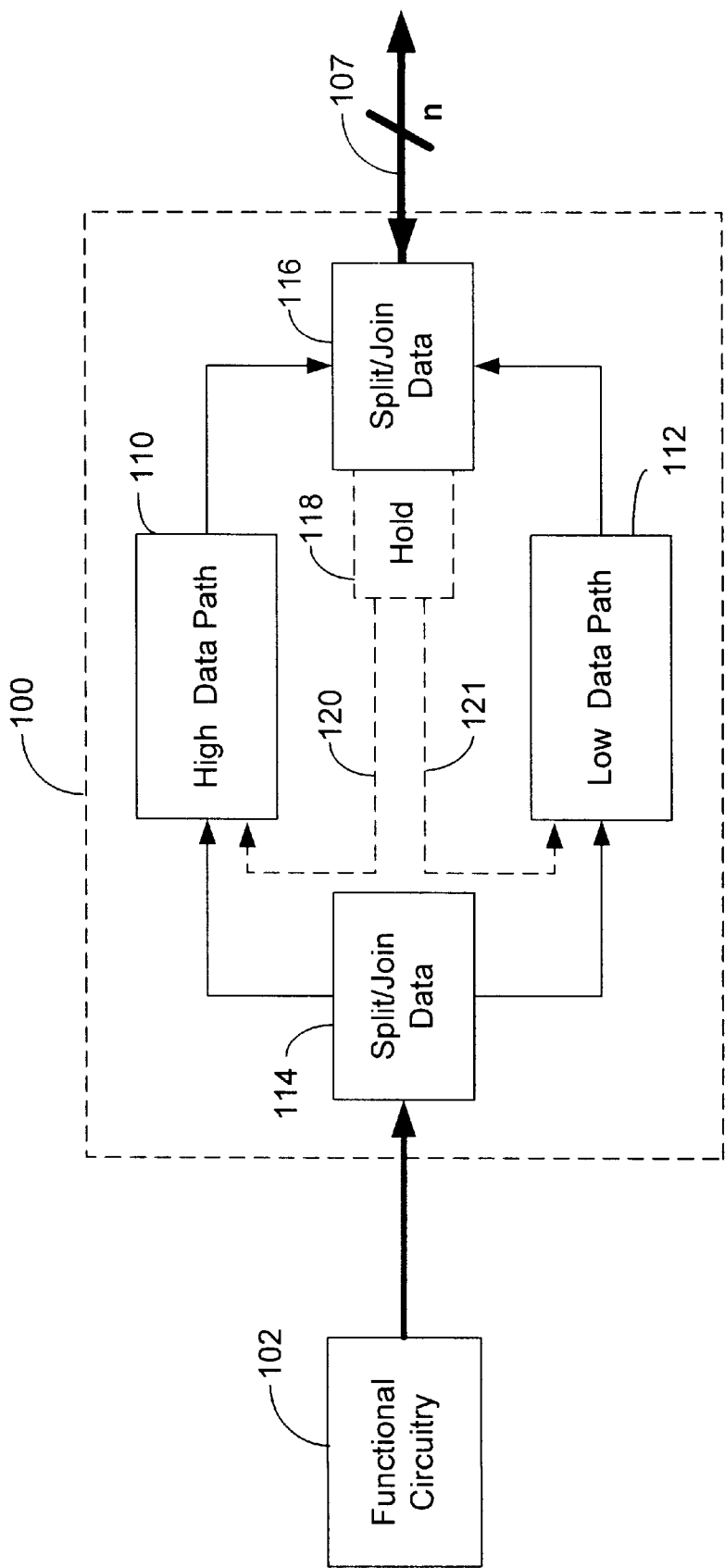
FIG. 4 is a block diagram illustrating fundamental components of an apparatus constructed in accordance with the present invention.

Reference is now made to FIG. 4, which shows a block diagram that illustrates certain fundamental components of the present invention. As previously mentioned, one aspect of the present invention is provided in a circuit for splitting the data into two portions—a high bit portion and a low bit portion. The circuit also includes two data paths. A first data path 110 communicates the high bit portion of the data and a second data path 112 communicates the low bit portion of the data. In this regard, each data path includes at least one bit. Consistent with the concepts and teachings of the invention, each data path may comprise a plurality of bits. However, for purposes of illustration herein, the illustrations of the data paths will illustrate only one bit per path. It will be appreciated, however, that those skilled in the art will appreciate that the circuitry illustrated herein may be readily duplicated to accommodate the transmission of additional bits.

As will be further described in connection with FIG. 5, timing and clocking signals are generated within the integrated circuit that control the transmission of data bits from the low data path and the high data path, coincident with every clock transition of a global clock. In this way, data may be transmitted over the bus with every transition (both low-to-high and high-to-low) of the global clock. Circuitry 114 and 116 is provided to split a data bus (e.g., eight bits) into two data paths (e.g., four bits each). The preferred circuitry for block 116 will be illustrated in more detail in connection with FIGS. 8A and 8B. The detailed circuitry for block 114, however, may be implemented in a variety of ways within the knowledge and ability of one skilled in the art, and it is not further described herein.

The apparatus further includes a hold circuit 118 configured to hold a last data value on the common data bus 107 for at least one clock cycle before allowing circuitry to receive data from the common bus 107. The preferred implementation of this circuitry will be illustrated in more detail in connection with FIGS. 8A and 8B. By way of introduction, however, it is illustrated here by dashed lines, feedback signals 120 and 121 are used in connection with this data hold aspect of the invention. In the broad sense, the data value last placed on the common bus 107 is also fed back to the inputs of each data path 110 and 112. This fed back value can be used to hold the output of the circuit for an additional clock cycle, when transitioning from a transmission state to a reception state. Advantageously, this helps prevent signal reflections from interfering with the reception of transmitted signals on the common bus 107.

Figure 5A:
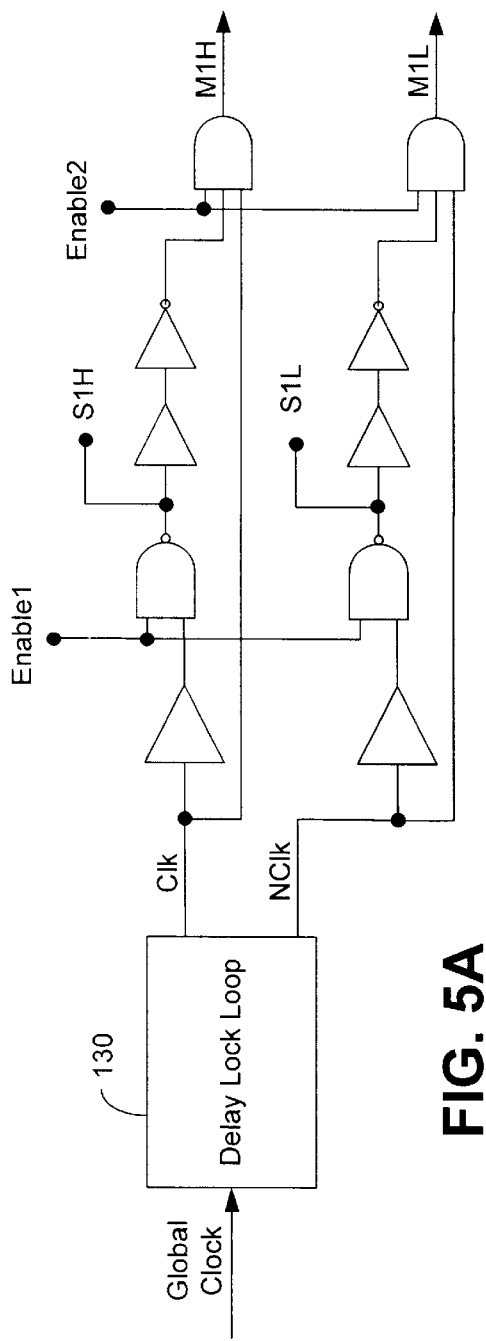
FIG. 5A is a schematic of a circuit used to generate clocking and timing signals in accordance with the preferred embodiment of the present invention.
Figure 5B:
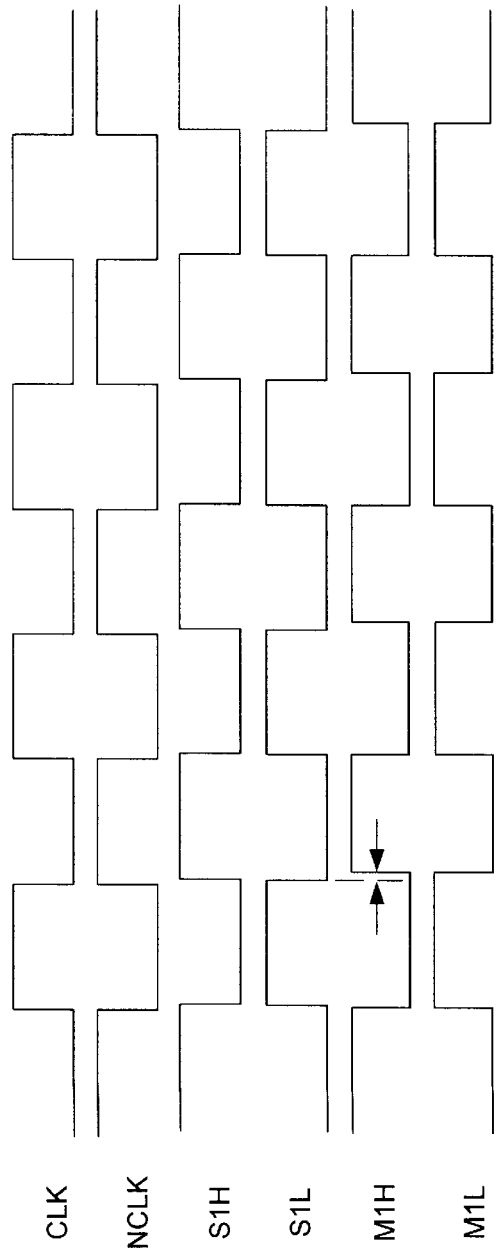
FIG. 5B is a timing diagram of certain clocking and timing signals generated by the circuit shown in FIG. 5A.

Having described the fundamental architecture of the present invention, reference is now made briefly to FIGS. 5A and 5B. FIG. 5A shows the circuitry that is used to generate certain clocks and timing signals that are used by the functional circuitry of the present invention. FIG. 5B shows a timing diagram that illustrates the relational timing of these signals.

In the preferred embodiment, a delay lock loop 130 receives a global (system) clock signal and generates two internal clock signals (CLK and NCLK) therefrom. By generating its own internal clock signals, the integrated circuit can minimize the load on the global clock signal, whereby the global clock signal may drive only a single gate. The two clock signals CLK and NCLK are the inverse of each other. The CLK signal substantially replicates the global clock signal (except for a slight time delay, and the NCLK signal substantially replicates the inverse of the global clock signal (again, except for a slight time delay). Advantageously, the delay between the CLK signal from the global clock signal and the NCLK signal from the global clock signal are substantially the same. This allows signals within the integrated circuit that are clocked from the CLK signal to be well synchronized with signals that are clocked from the NCLK signal. In this regard, the CLK signal is used for synchronizing the data transmission of data signals through the first data path 10, and the NCLK signal is used for synchronizing the data transmission of data signals through the second data path 112.

As will be appreciated by those skilled in the art, a signal may be more robustly clocked off the high-to-low transition of a clock signal than off the low-to-high transition of a clock signal. This is because the current may be more readily sunk (high to low) than driven (low to high). Thus, the high-to-low transition presents a sharper edge than the low-to-high edge. Accordingly, the high-to-low edges of the CLK and NCLK signals may be used to effectively clock data from the integrated circuit coincident with every edge of the global clock signal.

As is further shown, M1H, M1L, S1H, and S1L clocking signals are generated. These signals generally following the CLK and NCLK signals as illustrated in the timing diagram of FIG. 5B. A point to note, however, is that the high to low transition of S1L and S1H are non-overlapping with the low to high transistion of M1L and M1H, respectively. In this regard, the edge transitions of M1H and M1L are delayed by at least three gate delays (the buffer, inverter, and AND gate), from the transitions of S1H and S1L, as illustrated in FIG. 5A. This delay prevents the undesired corruption of data that is clocked by these signals (See FIGS. 8A and 8B).

Also illustrated in FIG. 5A are two signals labeled Enable1 and Enable2. During normal functional operation of the circuitry of the present invention, these signals will be high, thereby enabling the operation of the AND gates to which they are input. In the preferred embodiment, their function relates to clocking data during scan testing, and therefore need not be described herein.

Figure 6:
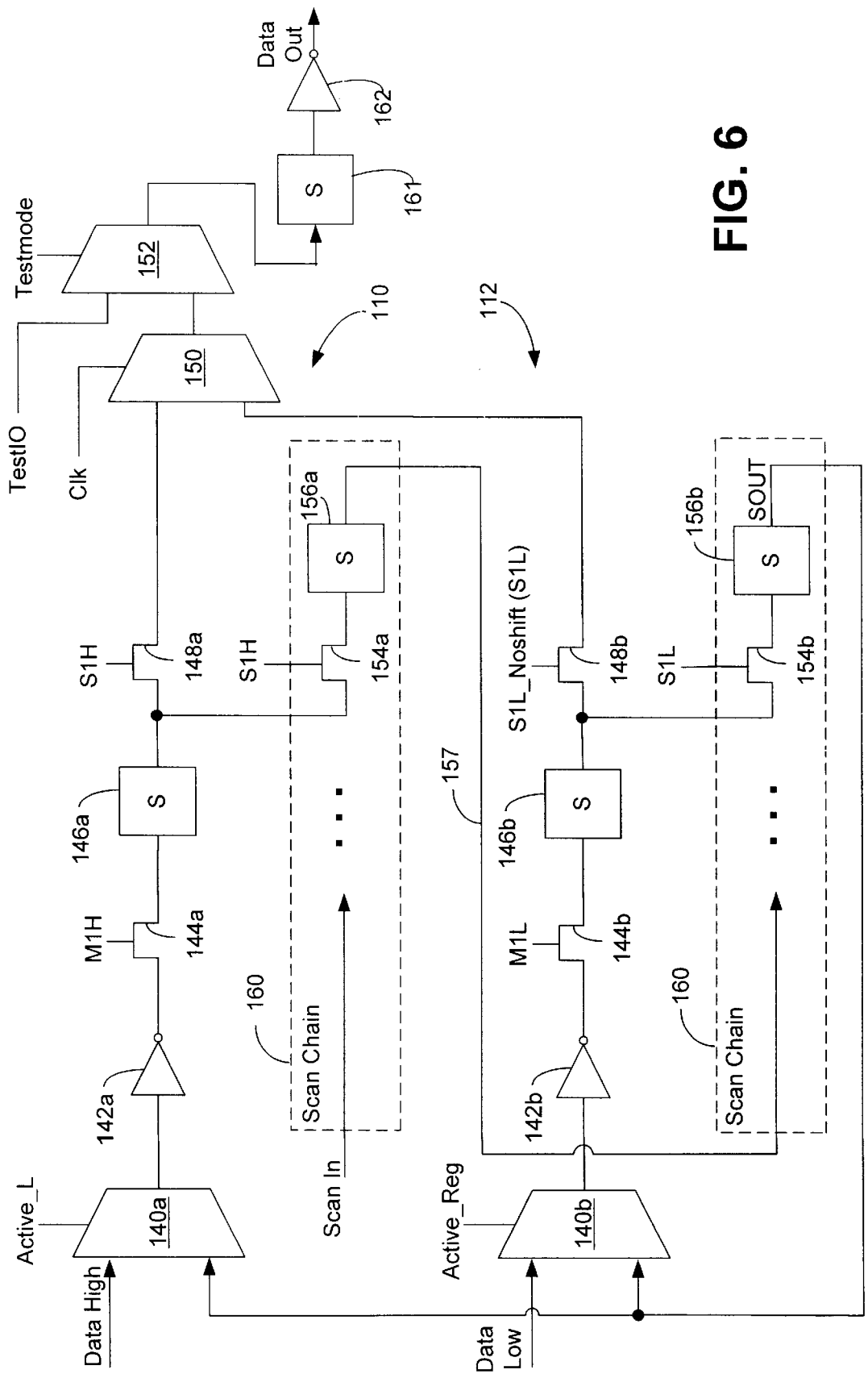
FIG. 6 is a block diagram illustrating primary circuit components used in the preferred embodiment of the present invention.

Having discussed the generation of clock and timing signals that are used in the circuitry of the preferred embodiment of the present invention, reference is now made to FIG. 6, which shows a block diagram of the basic circuit components of the preferred embodiment. As shown, the circuit comprises two similar portions 110 and 112. As discussed in connection with FIG. 4, portion 110 defines a data path for at least one high bit (high in significance not state) and portion 112 defines a similar data path for at least one low bit. The clocking signals CLK, M1H, M1L, S1H, and S1L, which are generated by the circuitry of FIG. 5A are illustrated as controlling certain devices of the circuitry of FIG. 6.

To understand the basic operation of the circuitry, consider first the high data path 110. A data bit is provided to an input of a multiplexer 140a. The output of this multiplexer is passed through an inverter 142a, which inverts the polarity of the signal and boosts its drive strength. Then, the signal is controllably passed through a pass gate 144a. This pass gate 144a is preferably implemented as an NFET (n-type field effect transistor), which is controlled by the signal M1H. The generation and timing of this control signal M1H was illustrated in FIG. 5A. When M1H is a one, it passes the signal through; when it is a zero it inhibits the passage of the signal through the pass gate 144a.

Following the pass gate 144a, a storage node 146a is disposed. A second pass gate 148a is disposed at the output of the storage node 146a. As illustrated, signal S1H is used to control the operation of this second pass gate 148a in the same manner that signal M1H controls the operation of pass gate 144a. In operation, the signal M1H opens the pass gate 144a to allow new data (Data High) to flow in the high data path 110, where it is stored at the storage node 146a. Then, at the falling edge of CLK, S1H opens the pass gate 148a, allowing the value stored on the storage node 146a to be directed to the circuit output and driven on the common bus. As illustrated, the data value is routed through a pair of multiplexers 150 and 152, and their purpose and operation will be described below.

Similar circuitry to that described above is also provided for the low data bit path 112. The corresponding components are denoted with like reference numerals having the suffix "b". The operation of these components is the same as that described above in connection with the high bit data path 110. As shown, however, the clocking signals M1L and S1L, are used to control the pass gates 144b and 148b, instead of clocking signals M1H and S1H. Actually, the signal S1L_Noshift (S1L) is shown as controlling the operation of pass gate 148b. In this regard, the functional operation and timing of S1L_Noshift is the same as S1L, which is the reason that S1L is indicated parenthetically in the drawing. The reason for the different signals was actually one of implementation. Briefly, both S1L and S1H are effected even during scan testing. It was found that under certain conditions during testing, this could cause a drive fight between the outputs of the two data paths 110 and 112. For example, if the output of data path 110 were driving a "1" while the output of data path 112 were sinking a zero, a large current flow would result from the output of the data path 110 into data path 112. Therefore, the signal S1L_Noshift was generated, and it is non-operative during scan testing. Thus, pass gate 148b always remains closed during testing, thereby preventing any drive fights between the two data paths 110 and 112.

Also shown in FIG. 6 is a scan chain 160. As is known by those skilled in the art and by way of background, a scan chain is used for scan-type testing. Broadside testing operates by applying test signals to the input pins of integrated circuit chips, and monitoring the output generated on output pins of that same chip. Due to the density of functional circuitry now provided on integrated circuit chips, scan-type testing is employed. To more specifically describe scan-type testing, if testing hardware has access only to the input and output pins of an integrated circuit chip, then the operation of the vast majority of the circuitry of most integrated circuit chips cannot practically be tested directly. Scan-type testing is achieved by providing specialized (functional) circuitry integrated within the integrated circuit chip to be tested that allows test inputs to be propagated into the chip for testing the functional logic thereof, and test outputs to be acquired.

By way of terminology, scan chains or scan registers are utilized in this fashion. For example, an integrated circuit chip includes functional circuitry (which may comprise both sequential and combinational logic) is provided on board the integrated circuit chip. A test vector (used in testing) contains a plurality of bits that define the test input and output. As is known, the bits of the test vector are generally set to values of either 1 or 0, but some may be don't care values (e.g., "X"). Often, the test vector is rather lengthy, and may comprise several hundred, or even several thousand, bits. These bit values are then shifted serially into the integrated circuit chip where they may be used to functional circuitry, which may be imbedded deep within the integrated circuit chip. In this regard, the bit values of the test vector are shifted into a scan register. The scan chain 160 is illustrated in the drawing as a series of storage elements and pass gates. Consistent with the terminology used herein, the collection of all the scan chains comprise a scan register. For purposes of simplicity and illustration, only one scan chain has been illustrated in the drawings.

It should be appreciated that, in practice, each bit position of a scan chain may be both an input and an output. That is, a test vector may be clocked into the chip via an input scan chain. Then, once the entire test vector is clocked into the chip, the functional circuitry to be tested is tested (by the vector), and the scan register may again be clocked to capture output values. At this time, the same scan chain/register may be viewed as an output scan register, and its value may be clocked out of the chip, where it is compared against an expected value for that register.

Having provided a top-level discussion of scan chains, and in keeping with the discussion of FIG. 6, scan chain 160 contains a plurality of controllable pass gates (e.g., 154a and 154b) and a plurality of storage nodes (e.g., 156a and 156b). An input is provided to the scan chain, where a serial data bit string may be clocked in to the scan chain. By providing a plurality of connection points between the scan chain and the functional circuitry, data values may be directed to specific test points of the functional circuitry, simply by shifting the values in via the scan chain 160. In similar fashion, output values may be acquired from specific points within the functional and shifted out via the scan chain 160. As depicted in FIG. 6, the output of the storage node 156a is directed to the input of the lower portion of the scan chain 160, making the scan chain 160 one continuous scan path.

As further shown in FIG. 6, the operation of pass gates 148b and 154b are both controlled (essentially) by the signal S1L, and their inputs are both connected to the output of storage node 146b. Thus, it is seen that the scan circuitry is operative during normal operation of the functional circuitry, as well as during scan testing. Therefore, when the circuitry is operating to direct data from the low bit data path 112 to the common bus, the pass gate 148b is opened to deliver this data to the circuit output. At the same time, pass gate 154b delivers this same data to storage node 156b. The output of this storage node then outputs the same data output to the common bus through pass gate 148b, at a slightly delayed time. More specifically, the output (SOUT) of this storage node 156b is directed to the inputs of both multiplexers 140a and 140b.

The purpose of feeding back the SOUT signal, output from storage node 156b, to the input of multiplexers 140a and 140b is to effectively hold the last data value placed on the common bus for one clock cycle, before receiving incoming data. In this regard, the signals Active_L and Active_Reg are provided to control the data selected by the multiplexers 140a and 140b. The state of these signals indicate whether the integrated circuit device is transmitting data to the bus or receiving data from the bus. In the preferred embodiment of the present invention, Active_L is a "1" when the integrated circuit is transmitting data, and is a "0" when the integrated circuit is receiving data. Active_L is registered from the falling edge of the global clock, while Active_Reg is the registered value of (rising edge) the same signal. Therefore, the state of Active_Reg follows the state of Active_L by one-half clock cycle, with transitions of Active_Reg occurring coincident with low-to-high transitions of the global clock.

Furthermore, it should be noted that in a data communication from the integrated circuit to the bus, the low bit data path 112 is always the last to drive the bus for every transaction. For this reason, the SOUT signal, which is the stored value of the low bit data value, is fed back to the multiplexers 140a and 140b, since it reflects the value of the last transmitted data value. During the course of transmitting successive data values, Active_L and Active_Reg are high, and the multiplexers 140a and 140b continually select from the data input. Therefore the SOUT signal is ignored. However, when the bus turns over from transmission to reception, Active_L and Active_Reg transition to a low state, causing the multiplexers 140a and 140b to select the SOUT signal for transmission to the bus. As will be better illustrated by the timing diagram of FIG. 7 and the circuit schematic of FIGS. 8A and 8B, this causes the last transmitted data value to be held on the bus for at least one clock cycle. Advantageously, this reduces deleterious effects of signal reflections that otherwise may occur due to the extremely fast transition times on the high speed bus.

Figure 7:
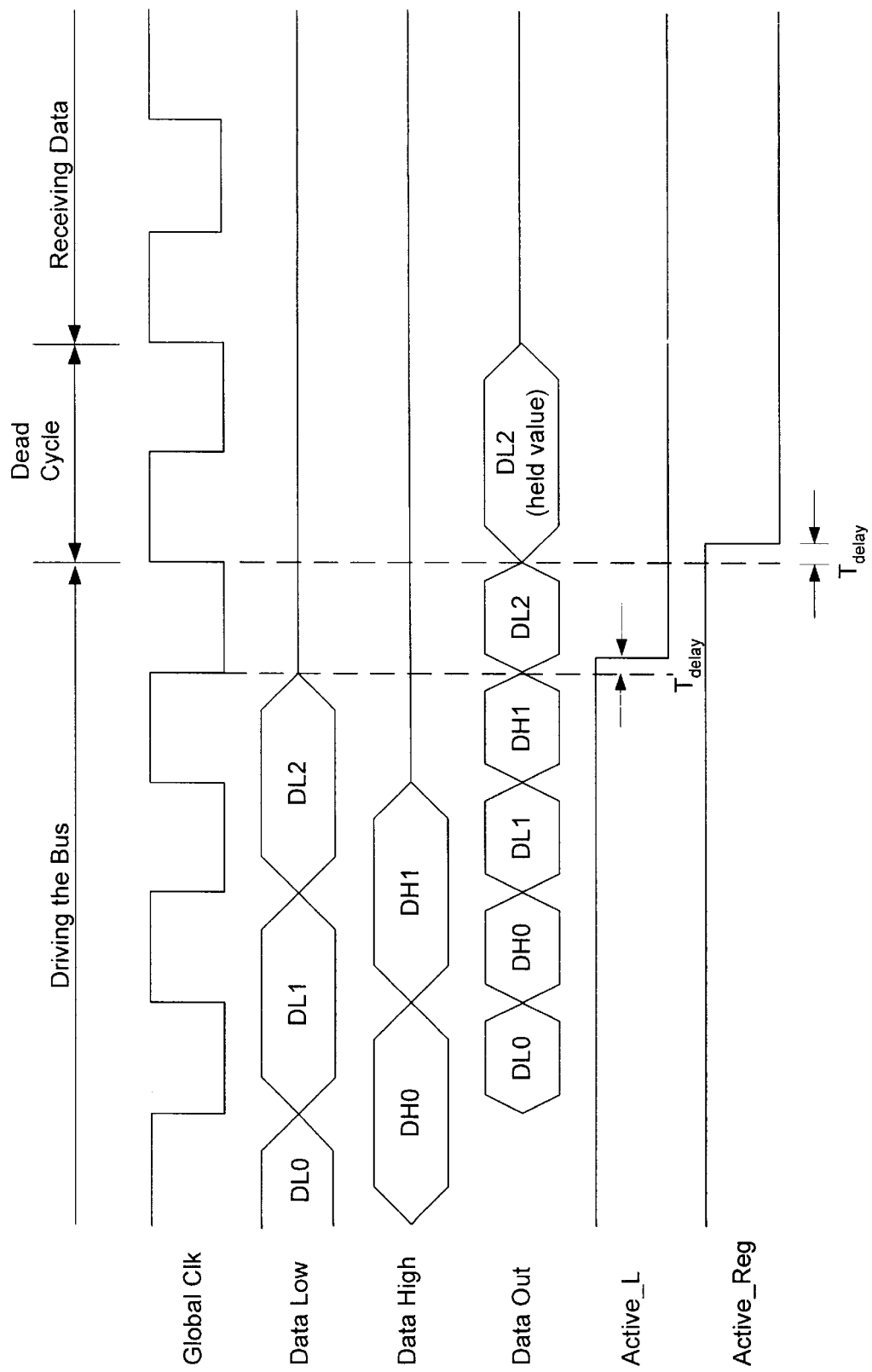
FIG. 7 is a timing diagram illustrating the relational timing of various signals of the circuit schematic of FIG. 6 and FIGS. 8A and 8B.

To better illustrate this, reference is now made briefly to FIG. 7, which is a timing diagram that depicts timing relationships among some of the principal signals of the preferred embodiment of the present invention. The signals denoted on Data High and Data Low reflect the signal values (or data) placed by the multiplexers 140a and 140b on the high bit data path 110 and the low bit data path 112. The signal denoted as Data Out reflects the value directed to the common bus. In this regard, although not shown in the timing diagram, clocking signals M1H, M1L, S1H, and S1L control various pass gates of the two signal paths 110 and 112, so that collectively data is output to the common bus coincident with every transition of the global clock. The values DL"n" and DH"n" represent the "nth" data transmission from the low bit data path 112 and the high bit data path 110, respectively.

As shown, the Active_L and Active_Reg signals remain high for a period of time to allow a plurality of data values to be placed on the common bus. However, at some point, the Active_L signal transitions from high to low to indicate that the integrated circuit device is to receive data from the common bus. As previously mentioned, this occurs during the transmission of a data value from the low bit data path 112 to the common bus. Thereafter, and coincident with the next rising edge of the global clock, Active_Reg transitions from high to low. The state of Active_L and Active_Reg cause the multiplexers 140a and 140b to direct the SOUT signal through the respective data paths. The SOUT value is driven through path 110 for one-half clock cycle, and then through path 112 for the next one-half clock cycle. In this way, the last data value transmitted through the low-bit data path 112 is held on the bus for a complete clock cycle before receiving data from the bus.

Returning briefly to FIG. 6, the outputs of the two data paths 110 and 112 are directed to the common data bus by way of multiplexers 150 and 152, storage node 161, and inverter 162. As will be appreciated from the schematic of the preferred implementation (FIGS. 8A and 8B), the multiplexer 150 is presented merely for purposes of functional illustration. That is, the multiplexer 150 illustrates the functional concept of directing the outputs from one of the data paths 110 and 112 to the bus at a time. By connecting both of these outputs to the input of a multiplexer and controlling the output of the multiplexer 150 to alternately select these inputs based on the state of the CLK signal, one can readily ascertain that the output from the first path 110 is directed to the bus during one-half of the CLK cycle, and the output from the second path 112 is directed to the bus during the other half of the CLK cycle.

However, in the preferred embodiment such a multiplexer is not actually utilized. Instead, the outputs of the two data paths are actually electrically connected. These signals are then controlled to ensure that only one drives the bus at any given time. In this regard, the S1H and S1L signals, which are of opposite value, control the operation of pass gates 144a and 144b such that only one path 110 and 112 can drive the bus at any given time.

A second multiplexer 152 is also shown, and is provided for testing purposes. In this regard, and as is known by persons in the art, JTAG is a standard that specifies various requirements for certain types of test structures. One such structure that the JTAG standard provides for is a multiplexer to control between functional data and test data in order to test a transmission pad. Therefore, the multiplexer 152 has inputs for both the functional data as well as test data (TestIO). The input selected is controlled by the Testmode signal. As will be described below in connection with FIGS. 8A and 8B, the preferred implementation of this multiplexer is done in a novel fashion, and one which advantageously reduces the clock to Q of the data (i.e., the time required to place valid data on the bus following the clock transition).

Figure 8A:
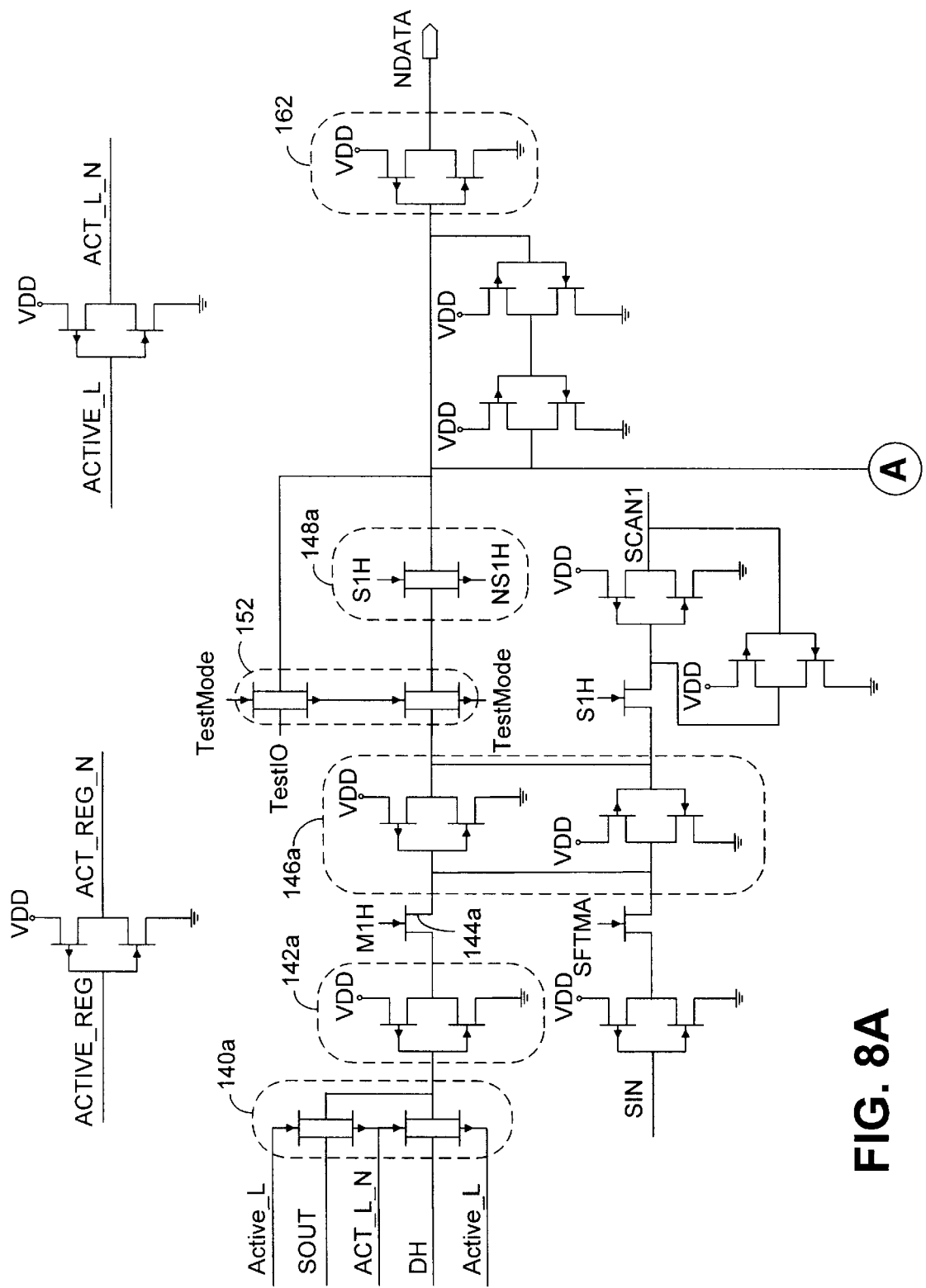
FIGS. 8A and 8B collectively comprise a schematic diagram of a circuit for carrying out certain aspects of the invention, in accordance with a preferred embodiment of the invention.
Figure 8B:
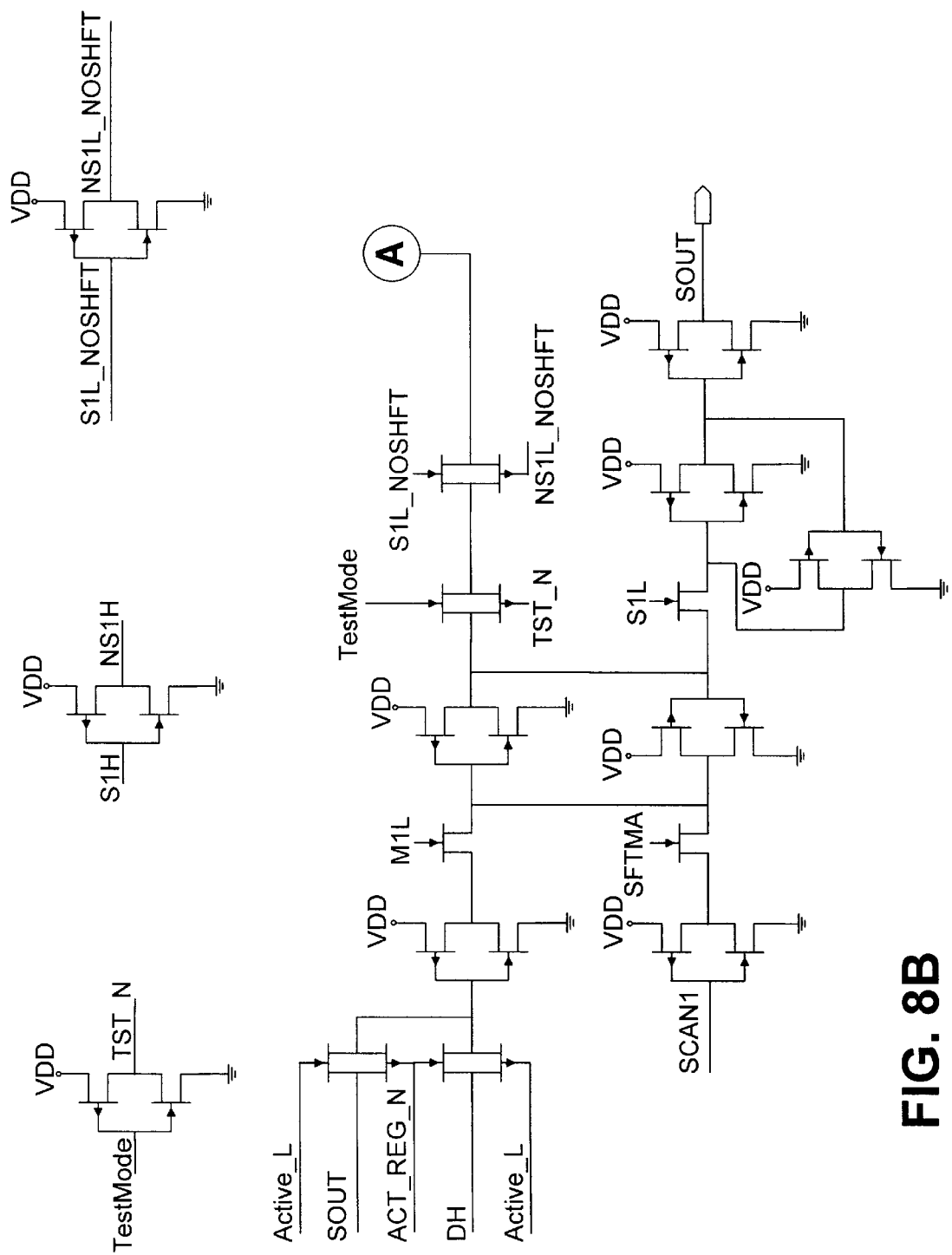

Reference is now made to FIGS. 8A and 8B which, collectively, illustrate a circuit schematic of the preferred implementation of the first and second data paths 110 and 1112. In this regard, those skilled in the art will understand the operation of the circuitry based upon the description already provided. To add to this description, however, it is observed that the circuit is created from a primary semiconductor circuit element—the field effect transistor (FET). N-type field effect transistors (or NFETs) are denoted by the transistor symbol having an inwardly-directed arrow on the gate, while p-type field effect transistors (PFETs) are denoted by the transistor symbol having an outwardly-directed arrow on the gate. Connecting a PFET and an NFET in side-by-side fashion creates an inverter, such as element 142a. Connecting a PFET and an NFET in an end-to-end arrangement creates a transmission gate, such as element 148a. Connecting two inverters in a circuitous fashion creates a storage node, such as 146a. Finally, interconnecting two transmission gates in the fashion denoted within the dashed lines designated as 140a creates a two input multiplexer.

To assist in the understanding of the schematic of FIGS. 8A and 8B, several of the elements of FIG. 6 have been encircled in dashed lines in FIG. 8A and designated with the same reference numeral as was used in FIG. 6. Specifically, the multiplexer 140a, the inverter 142a, the pass gate 144a, the storage node 146a, and the transmission gate 148a have all been designated in FIG. 8A. Similar structures are also present in FIG. 8B.

One structure in FIG. 8A worthy of special mention is the multiplexer 152. Rather than being disposed at the output, as functionally denoted in FIG. 6, this multiplexer 152 has been integrated into the back end of the storage node 146a. While functionally the multiplexer operates in the fashion described in FIG. 6, its implementation in the fashion shown has realized improved performance of the integrated circuit. Specifically, the multiplexer 152 takes advantage of the charge sharing effect with the storage node 146a, such that when the clock signal S1H directs the data value to the output bus, a significantly faster clock-to-Q is achieved than would be achieved if the valued were passed through the multiplexer downstream of the pass gate 148a. As is known, the clock-to-Q time is the time required to have a valid data output, following the triggering edge of the clock.

Various signals are illustrated in the schematic diagrams of FIGS. 8A and 8B by name. Some of these signals are generated by inverters. Of these inverter-generated signals, inverter circuits are shown in FIGS. 8A and 8B illustrating the generation of these signals. For example, FIG. 8A illustrates the generation of signals ACT_REG_N and ACT_L_N from signals ACTIVE_REG and ACTIVE_L, respectively, through the use of inverter circuits. Likewise, FIG. 8B illustrates the generation of signals TST_N, NS1H, and NS1L_NOSHFT from signals Testmode, S1H, and S1L_NOSHFT, respectively, through the use of inverter circuits.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for transferring data from an integrated circuit capable of bidirectional data communication comprising the steps of:
   generating a first clock signal and a second clock signal from a global clock signal, where the first clock signal is substantially the same as the global clock signal and the second clock signal is substantially the inverse of the global clock signal;
   splitting data that is to be transferred into two groups, a first group having at least one high bit and a second group having at least one low bit;
   transmitting the data on a common output bus by alternatively transmitting data from one of the two groups in response to a falling edge of the first clock and from the other of the two groups in response to a falling edge of the second clock; and
   holding the value of the last data group on the common bus for at least one clock cycle before receiving data on the common bus.

2. A method for transferring data from an integrated circuit capable of bidirectional data communication comprising the steps of:
   splitting data into a first group of bits and a second group of bits;
   providing a first data path for transmitting the first group of bits;
   providing a second data path for transmitting the second group of bits;
   electrically connecting an output of the first data path to an output of the second data path at a common bus;
   alternatively transmitting data over the first path and the second path, and ensuring the two data path outputs are not driven at the same time; and
   holding a last data value on the common bus for at least one clock cycle before receiving data over the common bus.

3. The method as defined in claim 2, further including the step of using an output from a scan chain associated with one of the data paths to control the holding of the last data value.

4. The method as defined in claim 3, wherein the step of using an output from a scan chain includes feeding back the scan chain output to multiplexers integrated into the data paths, and controlling the multiplexers to pass the output from the scan chain.

5. An apparatus for transferring data from an integrated circuit capable of bidirectional data communication comprising:
   a circuit for splitting the data into two portions, a high bit portion and a low bit portion;
   two data paths, a first data path for communicating the high bit portion and a second data path for communicating the low bit portion;
   an output circuit configured to connect outputs of the first and second data paths to a common, bidirectional data bus; and
   a hold circuit configured to hold a last data value on the common data bus for at least one clock cycle before allowing circuitry to receive data from the common bus.

6. The apparatus as defined in claim 5, further including at least one scan chain electrically coupled to the first and second data paths for testing circuit devices in the first and second data paths.

7. The apparatus as defined in claim 6, wherein an output of one of the at least one scan chains is fed back to an input of at least one of the data paths.

8. A test multiplexer integrated within an apparatus for transferring data from an integrated circuit capable of bidirectional data communication, wherein the apparatus includes a data path for communicating data to a circuit output, the data path having a storage node for storing a data value to be output, the data path further having a transmission gate having an input in communication with the output of the storage node, the transmission gate configured to controllably direct the data stored on the storage node to the circuit output, the test multiplexer comprising:

a first pair of field effect transistors coupled to form a transmission gate disposed serially between the storage node and the transmission gate;

a second pair of field effect transistors coupled to the first pair of field effect transistors, the second pair of field effect transistors having a test input and an output connected to an output of the transmission gate, the first and second pair of field effect transistors both having a common control signal, wherein the state of the control signal determines whether the output of the storage node is directed to the circuit output or whether the test input is directed to the circuit output.

9. The test multiplexer as defined in claim 8, wherein each pair of field effect transistors includes one p-type field effect transistor and one n-type field effect transistor.

10. The apparatus as defined in claim 9, wherein the first and second pair of field effect transistors are coupled by directly connecting a gate from the n-type field effect transistor of the first pair of transistors to a gate of the p-type field effect transistor of the second pair of transistors.

11. The apparatus as defined in claim 10, wherein the common control signal is connected to a gate of the p-type field effect transistor of the first pair of transistors and to a gate of the n-type field effect transistor of the second pair of transistors.

\* \* \* \* \*